United States Patent
Chen

(10) Patent No.: US 8,570,937 B2
(45) Date of Patent: Oct. 29, 2013

(54) TELECOMMUNICATIONS SYSTEM AND METHOD

(75) Inventor: Xiaobao Chen, Swindon (GB)

(73) Assignee: Orange SA, Paris (FR)

( * ) Notice: Subject to any disclaimer, the term of this patent is extended or adjusted under 35 U.S.C. 154(b) by 1337 days.

(21) Appl. No.: 12/087,690

(22) PCT Filed: Jan. 18, 2007

(86) PCT No.: PCT/GB2007/000139
§ 371 (c)(1),
(2), (4) Date: Nov. 3, 2008

(87) PCT Pub. No.: WO2007/083113
PCT Pub. Date: Jul. 26, 2007

(65) Prior Publication Data
US 2009/0201852 A1    Aug. 13, 2009

(30) Foreign Application Priority Data
Jan. 18, 2006 (GB) .................................... 0601026.8

(51) Int. Cl.
*H04W 4/00* (2009.01)
*G06F 15/16* (2006.01)

(52) U.S. Cl.
USPC ......................................... 370/328; 709/245

(58) Field of Classification Search
USPC .......................................................... 370/328
See application file for complete search history.

(56) References Cited

U.S. PATENT DOCUMENTS 6,519,235 B1 * 2/2003 Kim et al. ...................... 370/331
(Continued)

FOREIGN PATENT DOCUMENTS

| GB | 2 403 097 | 12/2004 |
|---|---|---|
| WO | WO 2005/006676 A1 | 1/2005 |
| WO | WO 2005/076573 A1 | 8/2005 |

OTHER PUBLICATIONS

M. St. Johns et al., "Consideration on the use of a Service Identifier in Packet Headers" Oct. 2003, pp. 1-8, Network Working Group RFC3639,Category: Informational, http://www.ietf.org/rfc/rfc3639.txt.

(Continued)

*Primary Examiner* — Guang Li
(74) *Attorney, Agent, or Firm* — Haverstock & Owens LLP

(57) ABSTRACT

A telecommunications system is arranged to provide a mobile communications session to a mobile node using an internet protocol. The telecommunications system comprises a home packet data network which includes a home agent of the mobile node and a visited packet data network. One of the home packet data network or the visited packet data network includes a packet data gateway for controlling the communication of the internet packets to and from the home packet data network from and to the visited packet data network. The mobile node is arranged to communicate a correspondent node binding update internet packet to the correspondent node via the packet date gateway, when the mobile node changes affiliation from the home packet data network to the visited packet data network. The correspondent node binding update internet packet provides a care of address of the mobile node within the visited packet data network and a home address of the mobile node. The packet data network is arranged to store the home address of the mobile node in association with the care of address of the mobile node, to adapt the correspondent node binding update internet packet by replacing the care of address in the received correspondent binding update packet with the address of the packet data gateway, and to communicate the adapted correspondent binding update packet to the correspondent node. The correspondent node therefore receives a correspondent binding update with the packet data gateway as the care of address. Thus, when the correspondent node communicates with the mobile node using the care of address of the packet data gateway, the packet data gateway can adapt the received internet packets, replacing the packet data gateway's address as the destination address with the care of address of the mobile node. Therefore, although a route optimization process has taken place the internet packets are still routed via the packet data gateway.

11 Claims, 13 Drawing Sheets

(56) References Cited

U.S. PATENT DOCUMENTS

| | | | |
|---|---|---|---|
| 7,051,109 B1* | 5/2006 | Stewart et al. | 709/230 |
| 7,054,283 B2* | 5/2006 | Carlsson et al. | 370/328 |
| 7,162,529 B2* | 1/2007 | Morishige et al. | 709/230 |
| 7,227,863 B1* | 6/2007 | Leung et al. | 370/390 |
| 7,257,104 B2* | 8/2007 | Shitama | 370/338 |
| 7,539,773 B2* | 5/2009 | Akisada et al. | 709/245 |
| 7,746,836 B2* | 6/2010 | Jentz et al. | 370/338 |
| 7,974,269 B2* | 7/2011 | Takeda et al. | 370/352 |
| 2001/0028647 A1* | 10/2001 | Teraoka | 370/389 |
| 2002/0172207 A1* | 11/2002 | Saito et al. | 370/400 |
| 2004/0120317 A1* | 6/2004 | Forssell | 370/394 |
| 2004/0136382 A1* | 7/2004 | Sundquist | 370/400 |
| 2004/0137888 A1* | 7/2004 | Ohki | 455/417 |
| 2004/0203765 A1* | 10/2004 | Das et al. | 455/435.1 |
| 2005/0099971 A1* | 5/2005 | Droms et al. | 370/328 |
| 2006/0003765 A1* | 1/2006 | Patil et al. | 455/432.1 |
| 2006/0106943 A1* | 5/2006 | Akisada et al. | 709/245 |
| 2009/0168721 A1* | 7/2009 | Chen | 370/331 |

OTHER PUBLICATIONS

C. Perkins, "IP Mobility Support for IPv4", Aug. 2002, pp. 1-99, Network Working Group RFC3344, Obsoletes: 3220, Category: Standards Track, ftp://ftp.rfc-editor.org/in-notes/rfc3344.txt.

$3^{rd}$ Generation Partnership Project, "Technical Specification Group Services and System Aspects; 3GPP system to Wireless Local Area Network(WLAN) interworking; System description (Release 7)", 2008, pp. 1-85, 3GPP Organizational Partners, 3GPP TS 23.234 V7.7.0.

$3^{rd}$ Generation Partnership Project, "Technical Specification Group Services and System Aspects; 3GPP System Architecture Evolution: Report on Technical Options Conclusions (Release 7)", 2007, 3GPP Organizational Partners, 3GPP TR 23.882 V1.1415.0.

* cited by examiner

TELECOMMUNICATIONS SYSTEM AND METHOD

FIELD OF THE INVENTION

The present invention relates to telecommunications systems operable to provide mobile communications sessions to mobile nodes using an internet protocol, in which the mobile nodes change affiliation from a home packet data network to a visited packet data network.

The present invention also relates to methods for providing mobile communications sessions to mobile nodes using an internet protocol, when the mobile node changes affiliation from a home packet data network to a visited packet data network.

BACKGROUND OF THE INVENTION

Packet data networks provide a facility for communicating data in the form of internet packets to and from communicating devices or nodes. The packet data network may provide a facility for mobile communications with a node (referred to generally as a mobile node) using, for example a radio access interface, which allows the communicating device node to be mobile within a radio coverage area provided by the network. For example, the General Packet Radio Service (GPRS) is a telecommunications standard developed by the $3^{rd}$ Generation Project Partnership (3GPP) which provides a facility for communicating internet packets via a radio access interface. A GPRS network can be formed using a Global System for Mobiles (GSM) or a Universal Mobile Telecommunications System (UMTS) backbone network. GPRS provides support for packet-orientated services and attempts to optimise network and radio resources for packet data communications using the Internet Protocol (IP).

The Internet Engineering Task Force (IETF) is a body, which is responsible for developing internet protocols for facilitating communications via the internet. For example, a well established internet protocol is the internet protocol version 4 (IPv4) which has been developed and standardised for personal computers to access the internet. The IETF has also developed a further standard known as the internet protocol version 6 (IPv6) which provides an improvement with respect to the IPv4 in terms of facilitating mobile communications and increased addressing options for user equipment The IPv6 standard is an example of a standard which provides a facility for route optimisation in which internet packets to be communicated between a mobile node and a correspondent node do not need to be routed via the mobile node's home agent. However, if internet packets are communicated using a packet data network such as a GPRS network, then such route optimisation procedures can be incompatible with the operation of the GPRS network.

SUMMARY OF INVENTION

According to an aspect of the present invention there is provided a telecommunications system operable to provide a mobile communications session to a mobile node using an internet protocol. The telecommunication system comprises a home packet data network operable to communicate internet packets to and from the mobile node to provide the communications session, when the mobile node is affiliated with the home packet data network. The home packet data network includes a home agent of the mobile node. The telecommunications system also includes a visited packet data network operable to communicate internet packets to and from the mobile node to provide the communications session, when the mobile node is affiliated with the visited packet data network. One of the home packet data network or the visited packet data network includes a packet data gateway for controlling the communication of the internet packets to and from the home packet data network from and to the visited packet data network. The mobile node is operable to communicate a correspondent node binding update internet packet to the correspondent node via the packet date gateway, when the mobile node changes affiliation from the home packet data network to the visited packet data network. The correspondent node binding update internet packet provides a care of address of the mobile node within the visited packet data network and a home address of the mobile node. The packet data network is operable to store the home address of the mobile node in association with the care of address of the mobile node, to adapt the correspondent node binding update internet packet by replacing the care of address in the received correspondent binding update packet with the address of the packet data gateway, and to communicate the adapted correspondent binding update packet to the correspondent node.

Embodiments of the present invention provide a facility for allowing-control of resources of a packet data network by a mobile node after the mobile node has roamed from the mobile node's home packet data network to a visited packet data network. Control of communications resources is provided using a packet data gateway. However, in order for the packet data gateway to control the communication of internet packets between the home packet data network and the visited packet data network to which the mobile node is attached, the internet packets communicated by the mobile in the visited network must be arranged to be routed through the packet data gateway.

Internet protocol version 6 (IPv6) is an example of an internet protocol which provides for route optimisation, which allows a mobile node to communicate with a correspondent node without passing through the home agent. To this end, a correspondent node binding update internet packet is communicated from the mobile node in the visited network to the correspondent node, which provides the correspondent node with a care of address of the mobile node in the visited network. Using this care of address the correspondent-node can communicate internet packets to the mobile node without having to send these internet packets via the home agent of the mobile node, thereby improving an efficiency of communications. However, if the internet packets do not pass through the home agent then, they will not pass through the packet data gateway.

To arrange for a route optimisation process to be accommodated, whilst ensuring that the internet packets communicated from the correspondent node pass through the packet data gateway, embodiments of the present invention arrange for the correspondent node binding update internet packet, which is sent by the mobile node to be routed via the packet data gateway. The mobile node provides in the correspondent node binding update packet, it's care of address in the visited network and it's home address. The packet data gateway receives the correspondent node binding update internet packet and stores the mobile node's home address in association with the mobile node's care of address. The packet data gateway then replaces the care of address of the mobile node in the correspondent node binding update packet with its own address. The correspondent node therefore receives the correspondent node binding update internet packet for the mobile node's communication session, and uses the address of the packet data gateway as the destination address as a care of address for internet packets to be communicated to the mobile node.

The correspondent node therefore receives a correspondent binding update with the packet data gateway as the care of address. Thus, when the correspondent node communicates with the mobile node using the care of address of the packet data gateway, the packet data gateway can adapt the received internet packets, replacing the packet data gateway's address as the destination address with the care of address of the mobile node. Therefore, although a route optimisation process has taken place the internet packets are still routed via the packet data gateway.

Embodiments of the present invention therefore provide an arrangement in which internet packets, communicated to and from a mobile node which has roamed from its home network to a visited network, are routed through a packet data gateway. As such control of the internet packets to or from the mobile node can be effected by the packet data gateway. The packet data gateway may provide policing functions as well as billing, authentication, authorisation and administration. In one example the packet data gateway forms part of the home network of the mobile node although in other examples the packet data gateway forms part of a network to which the mobile node has roamed which will be referred to as the visited network.

In examples where the packet data gateway forms part of the home network, a security internet protocol tunnel may be established between the packet data gateway and the mobile node in the visited network. The security internet protocol tunnel may in some embodiments be an IPsec tunnel, in accordance with the 3GPP standard.

Various further aspects and features of the present inventions are defined in the appended claims.

BRIEF DESCRIPTION OF THE DRAWINGS

Embodiments of the present invention will now be described by way of example only with reference to the accompanying drawings where like parts are provided with corresponding reference numerals and in which:

FIG. 7 provides a schematic block diagram of a home packet data network and a visited packet data network, in which the visited network includes a packet data gateway and a foreign agent, and illustrating an example of the present technique in which the packet data gateway and the foreign agent tunnel data packets there between;

DESCRIPTION OF EXAMPLE EMBODIMENTS

3GPP and Non-3GPP Networks

As will be appreciated, embodiments of the present invention find application with various types of packet data networks. However, in one example either a home network of a mobile node or a visited network of the mobile node is arranged to operate in accordance with a 3GPP standard, or both whilst in other embodiments one of the home network or the visited network may operate in accordance with a standard which is a normal 3GPP standard.

Figure 1:
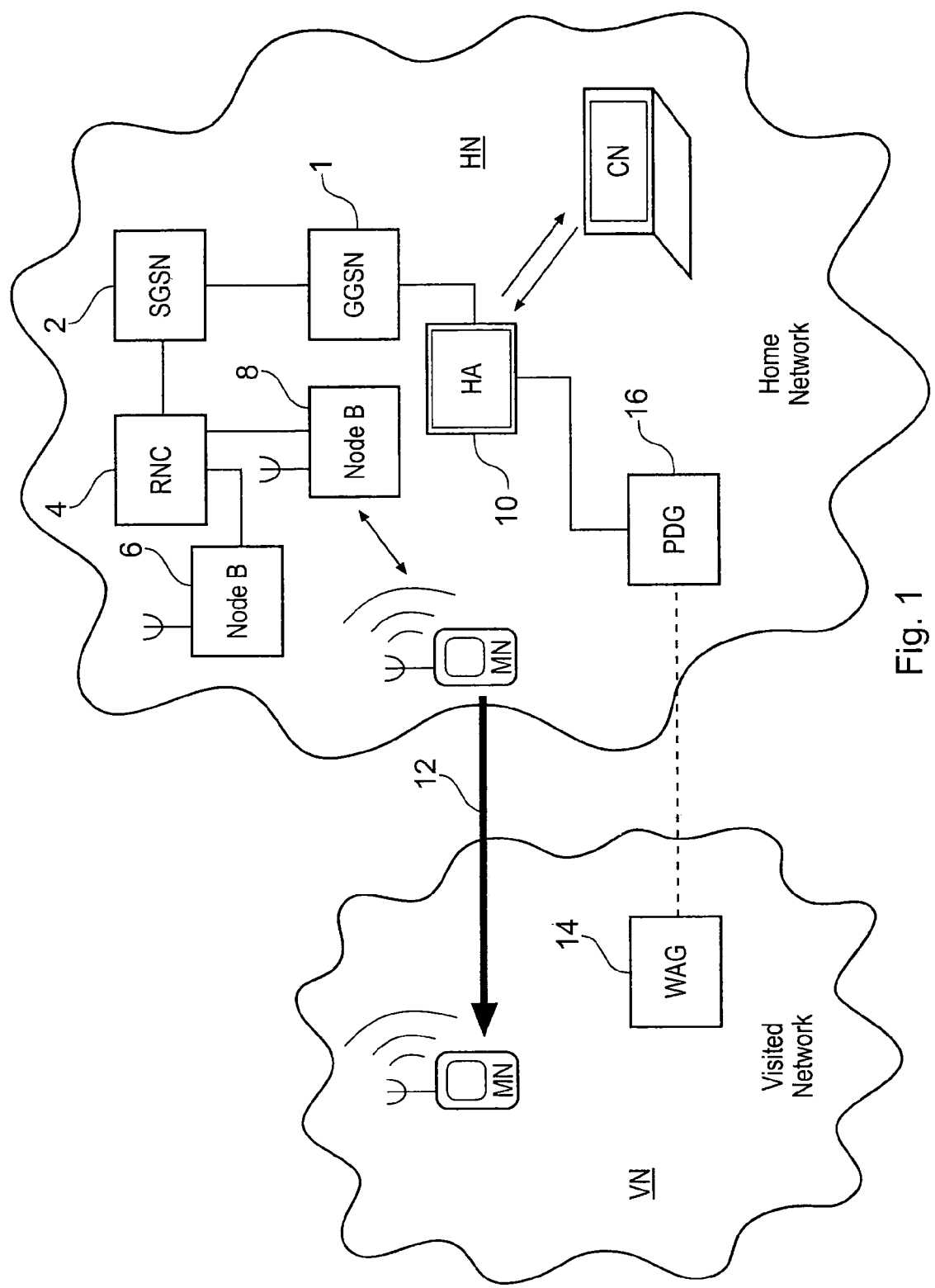
FIG. 1 provides a schematic block diagram illustrating an example in which a mobile node roams from a 3GPP packet data network to a non-3GPP packet data network.

FIG. 1 shows an example in which a mobile node MN roams from a home network HN to a visited network VN. As shown in FIG. 1 the home network HN is a packet data network which operates in accordance with a General Packet Radio System (GPRS) and so elements forming part of the GPRS network correspond to the GPRS standard. The GPRS network therefore includes a GPRS Gateway Support Node (GGSN) 1, a Serving Gateway Support Node (SGSN) 2, and a Radio Network Controller (RNC) 4. Connected to the RNC 4 is shown two Node Bs 6, 8 which serve to provide a radio access interface to mobile nodes within a radio coverage area provided by each of the Node Bs. It will of course be appreciated that within a GPRS network there are likely to be many RNCs and Node Bs, although only one RNC 4 and two Node Bs 6, 8 are shown in FIG. 1 for simplicity.

As shown in FIG. 1, the mobile node MN when attached to the home network communicates via the radio access interface in accordance with the Universal Terrestrial Radio-Access Network (UTRAN) standard to transmit and receive data. The data transmitted and received between the Node Bs 6, 8 and the mobile node MN represents internet protocol packets. Thus in accordance with an example embodiment a communications service is provided to the mobile node MN which establishes a communications session between the mobile node MN and the home network HN in which internet packets are transmitted to and received from the Node Bs 6, 8 via the radio access network. Whilst the mobile node MN is attached to the home network, the internet packets are communicated to and from a home agent HA 10 which is connected to the GGSN 1. If the mobile node MN stays affiliated with the home network HN then the internet protocol packets which are communicated with a correspondent node CN are routed via the home agent 10.

According to an example embodiment the mobile node MN may roam to another network. The mobile node MN becomes attached to a visited network VN having left a radio coverage area provided by the home network HN. Thus as represented by an arrow 12 in FIG. 1 the mobile node MN roams from the home network HN to the visited network VN.

In accordance with known internet protocol standards, when a mobile node roams to a visited network VN then the mobile node will execute a binding update so that the home agent 10 can forward internet packets to the mobile node MN in the visited network VN. This is true for both internet protocol version 4 (IPv4) and internet protocol version 6 (IPv6). Thus as those acquainted with the internet protocols will appreciate, once the mobile node has roamed to a visited network a binding update procedure is followed as a result of which the mobile node acquires a care of address which is to be used for communicating packets sent to and received from the mobile node whilst it is affiliated with the visited network. In addition when a mobile node roams to a visited network which is operating in accordance with IPv6, then in accordance with a route optimisation procedure a correspondent node is informed of the mobile node's care of address within the visited network and a correspondent node binding update process is performed.

Typically the visited network will include a Wireless Access Gateway WAG 14, via which all internet packets transmitted from the foreign network (egressing) or received by the visited network (ingressing) will pass.

In order to allow for a GPRS network to monitor the use of resources of the GPRS network and to administer authentication, billing and policing of the communication of internet packets on the GPRS network, a packet data gateway (PDG) 16 is provided. Thus as shown in FIG. 1 a packet data gateway PDG 16 is attached to home agent 10. However, in order to correctly apply policing, resources and billing and other administrative functions all internet packets egressing from the home network and ingressing to the home network must pass through the packet data gateway (PDG) 16. However, once the mobile node MN has roamed to a visited network VN and acquired a care of address the internet packets sent from MN or received by the MN will in accordance with an IPv4 operation simply be routed to the home agent 10 and not pass through the packet data gateway.

According to the present technique internet packets which are sent by or received from a mobile node MN which has roamed to a visited network to pass through a packet data gateway. The packet data gateway may be in either the home network as it is shown in FIG. 1 or may be in the visited network. Further example embodiments will be explained below for both the IPv4 case, the IPv6 case and other scenarios in which the PDG is either in the home network or the visited network or indeed whether the visited network includes a foreign agent or not. These embodiments arrange for internet packets sent to and received from the mobile node when it has roamed to a visited network to be routed via a packet data gateway. These example embodiments will now be explained.

PDG in the Home Network with IPv4 and No Foreign Agent

Figure 2:
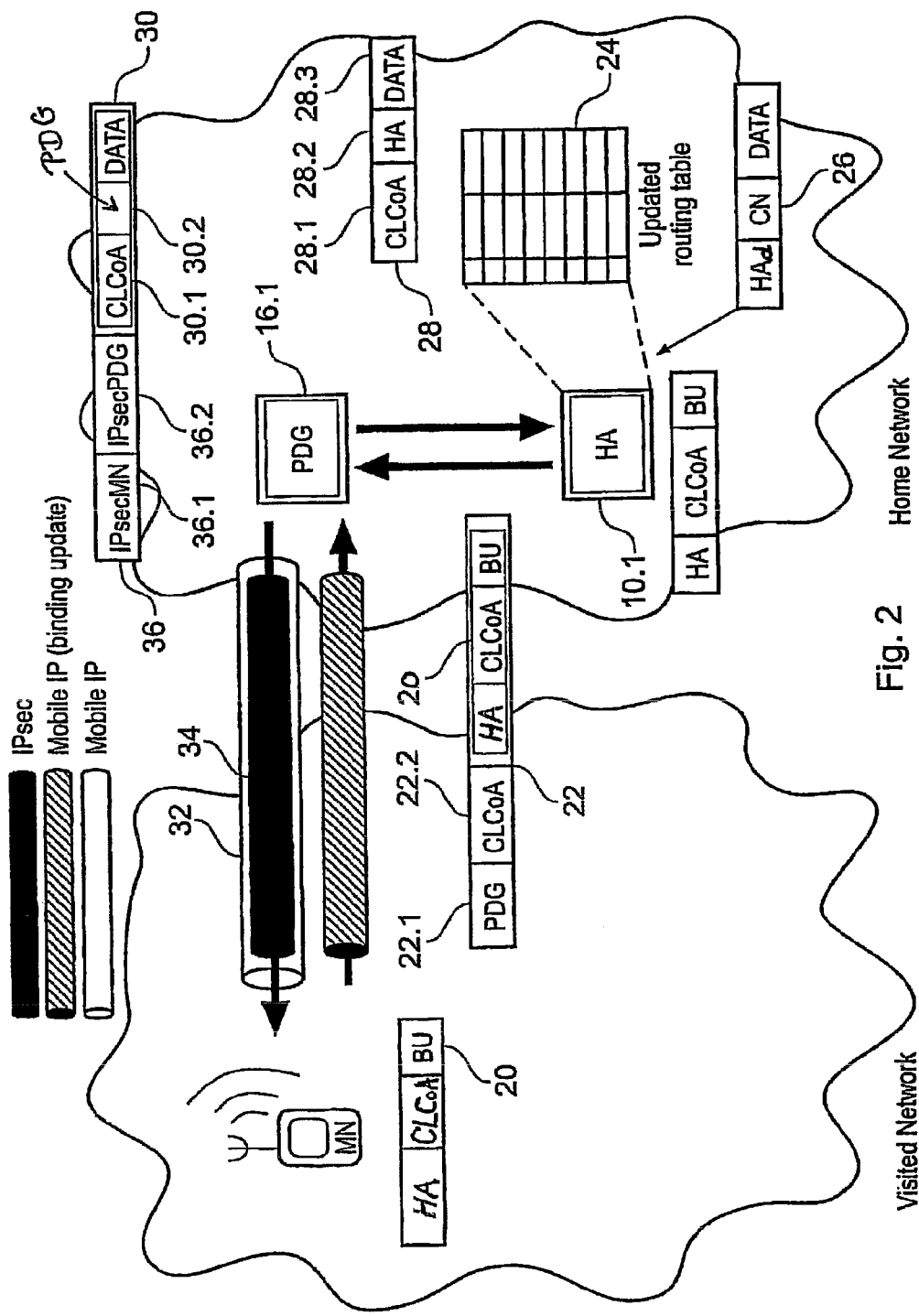
FIG. 2 provides a schematic block diagram for an example corresponding to the shown in FIG. 1, in which the mobile node generates a co-located care of address and the packet data gateway is in the home packet data network, and illustrating an example of the present technique.

FIG. 2 shows an example where the packet data gateway is present within a home network HN of a mobile node MN. Thus as shown in FIG. 2 an example where the home network HN and visited network VN corresponding to those shown in FIG. 1 are represented in a simplified form. The example shown in FIG. 2 shows the packet data gateway PDG 16.1 within the home network HN with the mobile node MN having roamed- to the visited network VN.

In accordance with a conventional operation, once the mobile node MN has roamed to the visited network VN a binding update procedure is performed. For the example shown in FIG. 2 the Internet protocol version is 4 (IPv4) so that the mobile node MN performs a binding update procedure in accordance with the IPv4 standard. Furthermore, for the example shown in FIG. 2, the visited network VN does not include a foreign agent so that the mobile node operates to generate its own care of address which is referred to as a co-located care of address CLCOA. Thus in accordance with the binding update procedure, a binding update packet 20 is communicated to the home agent 10 in the home network HN. However, since all internet protocol packets entering and leaving the home network HN must be routed through the packet data gateway 16.1 the binding update 20 is tunneled through the PDG. Accordingly, an encapsulated internet protocol packet 22 sent between the mobile MN and the PDG 22 has an additional header with a destination address 22.1 being that of the PDG 16, the source address 22.2 being the colocated care of address CLCoA of the MN and the payload providing the binding update packet 20. Once the tunneled packet 22 is received by the PDG 16 the additional tunneling header addresses 22.1, 22.2 are removed and the packet is forwarded by the PDG to the home agent 10.1.

Figure 3:
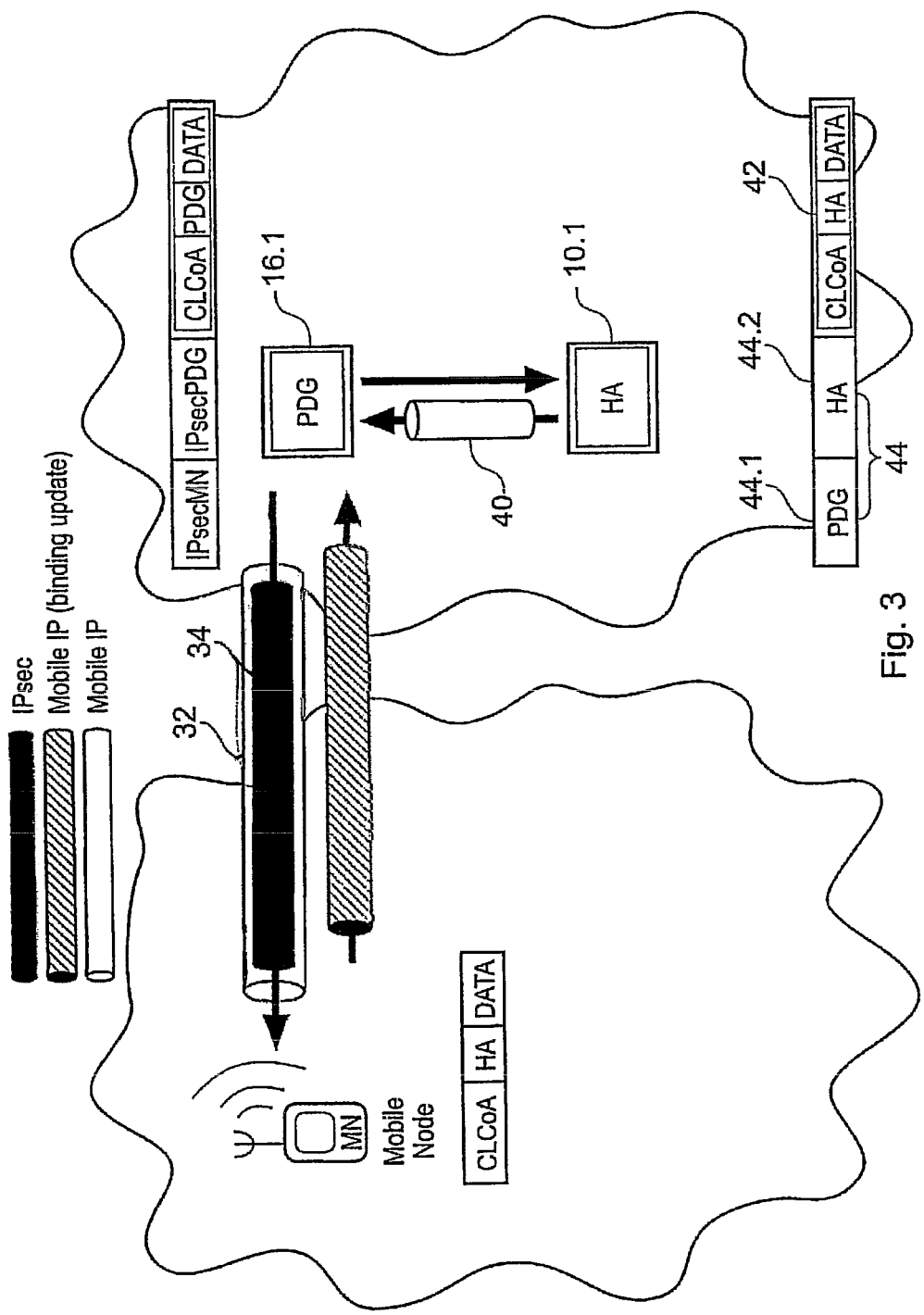
FIG. 3 provides a schematic block diagram for the example shown in FIG. 2, with the packet data gateway and the home agent arranged to tunnel data between each other.

In accordance with this example, the home agent 10.1 is adapted to ensure that any internet packets which are addressed to the mobile node MN in the visited network at the care of address CLCoA are routed via the packet data gateway 16.1. In the present example shown in FIG. 2 the routing of the packets to the packet data gateway 16.1 by the home agent 10.1 for the mobile node MN at the co-located care of address CLCoA is arranged by updating a routing table 24 which forms part of the home agent 10.1. Thus in the routing table the home agent 10.1 includes the home address of the mobile node HA in association with the co-located care of address CLCoA. In addition, in association with the co-located care of address CLCoA, a default router option is set to force the packets received by the home agent 10.1 for the mobile node MN at the co-located care of address CLCoA to be routed through the packet data gateway 16.1. FIG. 3 which will be explained shortly, provides an example in which internet packets for the mobile node in the visited network are tunneled to the packet data gateway 16.1 from the home agent for communicating to the mobile node MN.

Returning to FIG. 2, an internet packet 26 sent from a correspondent node CN to the mobile node MN is routed to the home agent 10.1. The routing table 24 has been updated and so the internet packet, addressed to the co-located care of address CLCoA of the mobile MN is forwarded to the packet data gateway 16.1 as the internet packet 28. Thus the internet packet 28 includes the co-located care of address CLCoA 28.1 as the destination address, the address of the home agent 10.1 as the source address 28.2 and the data for communication to the mobile node 28.3. At the packet data gateway 16.1 the received internet packet 28 is tunneled to the mobile node using a mobile internet protocol tunnel 32 set up between the packet data gateway and the mobile node MN. Thus by applying the co-located care of address CLCoA as the destination address 30.1 and the address of the PDG as the source address 30.2 the data can be communicated via the mobile IP tunnel 32 to the mobile node MN in the visited network VN.

In order to provide a secure communication of the internet packet to the mobile node MN within the visited network a secure internet protocol tunnel 34 is established within the mobile IP tunnel 32. Thus as shown by the form of the internet packet 30 which is to be sent to the mobile node MN an additional header 36 is included which has a source address and a destination address. In one example the secure internet protocol tunnel conforms to the IPsec standard. Thus the communication of the tunneled internet packet between the packet data gateway 16.1 and the mobile node MN conforms to the 3GPP standard.

As shown in FIG. 2, the destination address 36.1 is the end of the IPsec tunnel 34 and so includes the destination address of the IPsec MN 36.1. The source address is then the start of the IPsec tunnel which is designated as the IPsec PDG 36.2. Thus as shown in FIG. 2, the IPsec header 36 is added at the packet data gateway 16.1 and communicated to the mobile node MN within the IPsec tunnel 34. The mobile node receives the IPsec encapsulated internet packet removes the IPsec header 36 and then receives the internet packet 28 at the co-located care of address CLCoA. Returning to FIG. 3, an example is illustrated which corresponds to that shown in FIG. 2. However, in contrast to FIG. 2 instead of updating the routing tables 24 of the home agent 10.1, an internet protocol tunnel is set up between the home agent 10.1 and the packet data gateway 16.1 which is represented in FIG. 3 as a tunnel 40. Thus as shown the received packet which is addressed to the mobile node MN at the co-located care of address CLCoA 42 is encapsulated as a tunneled packet by adding a header 44. The header 44 includes a destination address 44.1 which is that of the packet data gateway 16.1 and a source address 44.2 which is that of the home agent 10.1.

After the packet 42 has been received by the packet data gateway 16.1 then communication of the packet 42 to the mobile node corresponds to the same process as represented in FIG. 2.

PDG in Home Network Mobile IPv4 Visited Network Includes a Foreign Agent

Figure 4:
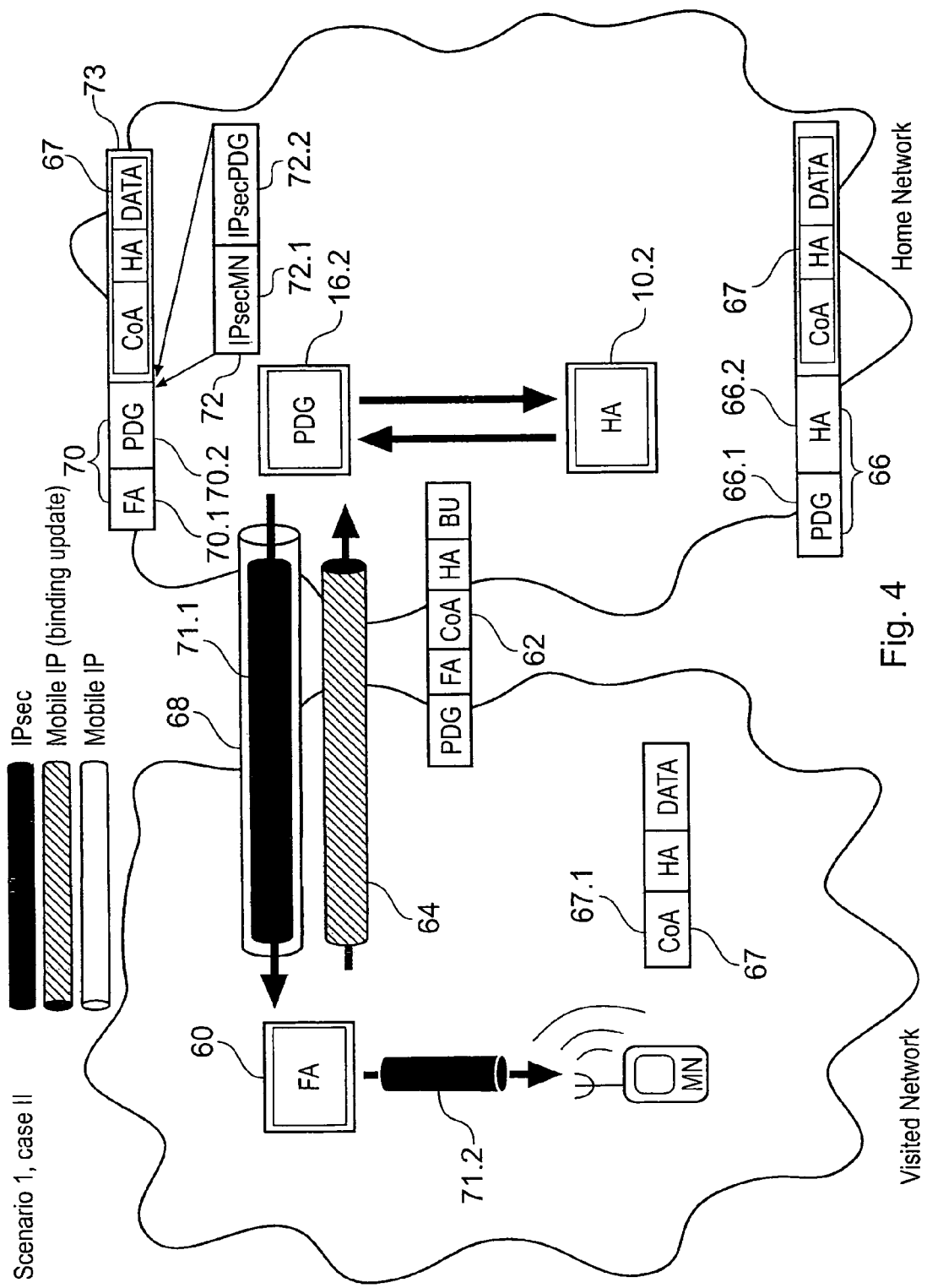
FIG. 4 provides a schematic block diagram for an example corresponding to the shown in FIG. 1, in which the visited network includes a foreign agent and the packet data gateway is in the home packet data network, and illustrating an example of the present technique.

FIG. 4 provides an illustration of a scenario which corresponds to that of the examples shown in FIGS. 2 and 3, that is with packet data gateway in the home network HN and with the internet packets being communicated in accordance with IPv4. However, in FIG. 4 the visited network VN includes a foreign agent FA 60 which acts as if it were a home agent in the visited network VN to the mobile node MN and performs the functions of the home agent for the mobile node MN in the visited network VN. Thus in accordance with the IPv4 standard the foreign agent 60 generates a care of address of the mobile node and initiates the binding update process. Thus in accordance with a binding update procedure a binding update packet 62 is sent via a binding update tunnel 64 between the foreign agent 60 and the packet data gateway 16.2. After the binding update packet 62 has been received by the packet data gateway 16.2 it is forwarded by the packet data gateway 16.2 to the home agent 10.2.

The operation of the scenario shown in FIG. 4 corresponds to that of the operation shown in FIGS. 2 and 3 with the home agent 16.2 either updating its routing table or tunneling packets which are to be routed to the mobile node MN in a visited network VN at the care of address COA, via the packet data gateway. Thus as for FIG. 2 the home agent 16.2 could update its routing table to route received packets to the mobile node MN via the packet data gateway or could establish a tunnel to encapsulate the packets to be sent to the mobile node MN by adding a header 66 with a destination address 66.1 of the packet data gateway a source address 66.2 of the home agent 10.2.

The presence of the foreign agent 60 in scenario shown in FIG. 4 adds an additional complication because an internet protocol security tunnel 68 must start at the packet data gateway 16.2 and end at the mobile node MN. However, because the internet protocol security tunnel (IPsec) must be secure then it is not possible for a tunnel to be established within the IPsec tunnel. However, in order to communicate internet packets to the mobile node MN within the visited network VN for the arrangement shown in FIG. 4, a mobile internet protocol tunnel is established between the packet data gateway 16.2 and the foreign agent 60 in order for the internet packets to reach the mobile node MN. To address this problem according to the embodiment shown in FIG. 4 the packet data gateway 16.2 is arranged to set up a mobile IP tunnel 68 before setting up the IP spec tunnel 71 which comprises a tunnel 71.1 between the packet data gateway 16.2 and the foreign agent 60 and a part 70.2 between the foreign agent 60 and the mobile node MN. To this end the packet data gateway 16.2 encapsulates the packet to be forwarded to the mobile node with a header having the destination address as the foreign agent with the source address as the packet data gateway. The packet data gateway 16.2 then inserts an IPsec header 70 with a source address 70.1 being that of the packet data gateway (IPsec PDG) and the destination address being that of the mobile node (IPsec MN) and inserts the IPsec header 70 between the mobile internet protocol tunnel header added by the packet data gateway to form an encapsulated packet 73.

FIG. 4 illustrates a process for communicating the internet packet 67 to the mobile node MN in the visited network VN: The home agent 16.2 encapsulates the internet packet 67 to be communicated with a header 66 having the destination address 66.1 as the packet data gateway 16.2 and the home agent HA as the source address 66.2. Once the packet 66 to be communicated to the mobile node MN has been received at the packet data gateway 16.2 the packet which is addressed to the mobile node at the care of address 67 is encapsulated with a mobile IP header 70 which has the foreign agent as the destination address 70.1 and the packet data gateway as the source address 70.2. However, the packet data gateway also inserts an IPsec header 72 having the destination address of the MN 72.1 as the end of the IPsec tunnel and the address of the packet data gateway IPsec PDG as the source address 72.2.

Since the mobile IP tunnel 68 terminates at the foreign agent 60 the mobile IP header 70 is removed and the packet is then forwarded to a mobile node which is the end of the IPsec tunnel 70.2 as a result of routing using IPsec header 72. At the mobile node the IPsec header is removed and the data packet is received at the mobile node at the care of address 67.1.

According to the arrangement shown in FIG. 4 the packet data gateway 16.2 and the home agent 10.2 are arranged to communicate internet packets to the mobile node MN via a foreign agent 60. An internet protocol security tunnel (IPsec) has then been established between the packet data gateway 16.2 and the mobile node MN even though the foreign agent exists in the visited network VN.

Figure 5:
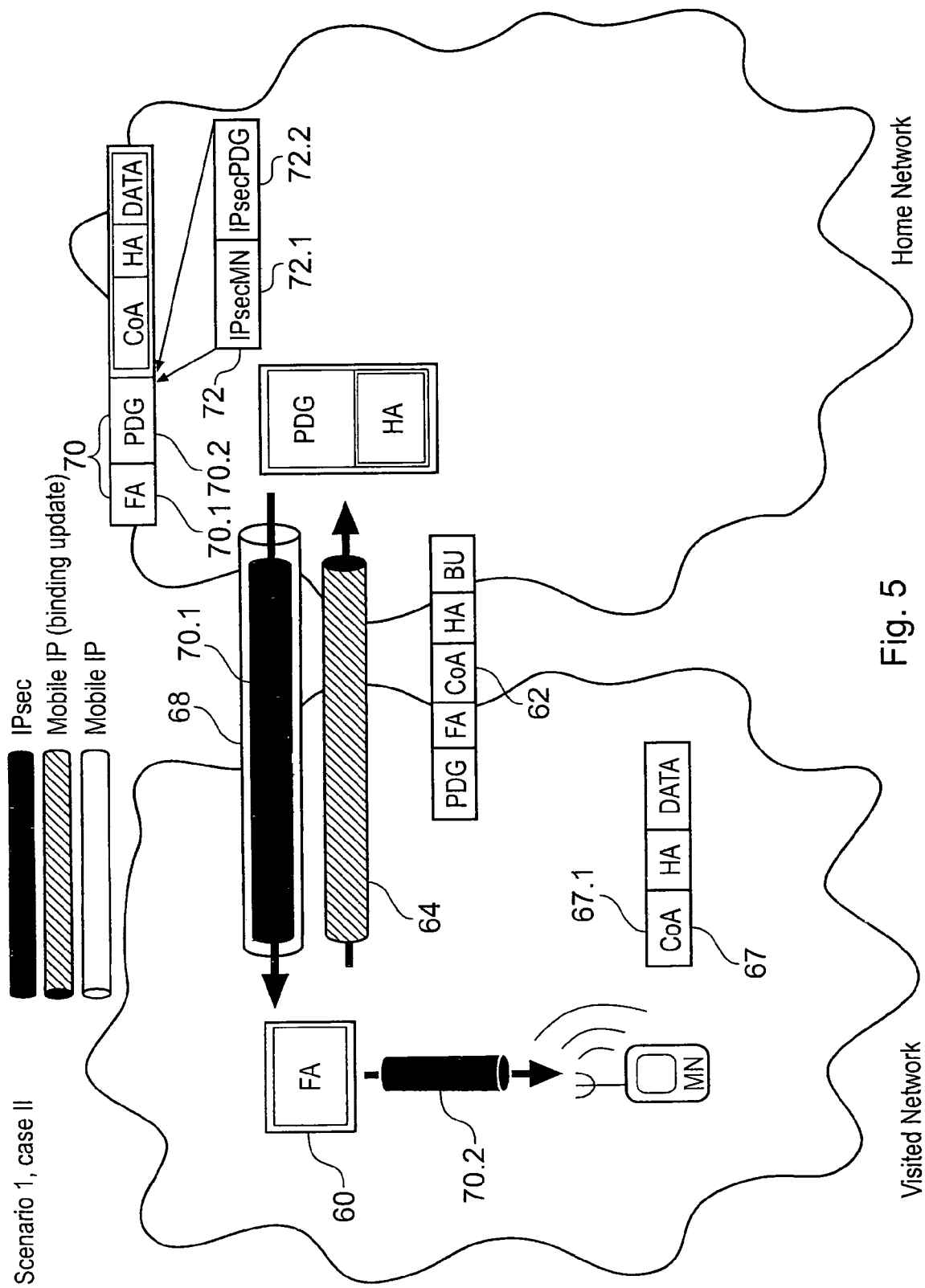
FIG. 5 provides a schematic block diagram for the example shown in FIG. 4, with the packet data gateway and the home agent being co-located in accordance with another example of the present technique.

As an alternative solution FIG. 5 illustrates an example where the packet data gateway is co-located with the home agent. As a result there is no requirement to adapt the routing table or establish a tunnel between the home agent the packet data gateway. However, the arrangement of the mobile IP tunnel being established before the IPsec tunnel as illustrated in FIG. 4 will also apply to FIG. 5.

PDG in Visited Network, IPv4 with a Foreign Agent in Visited Network

Figure 6:
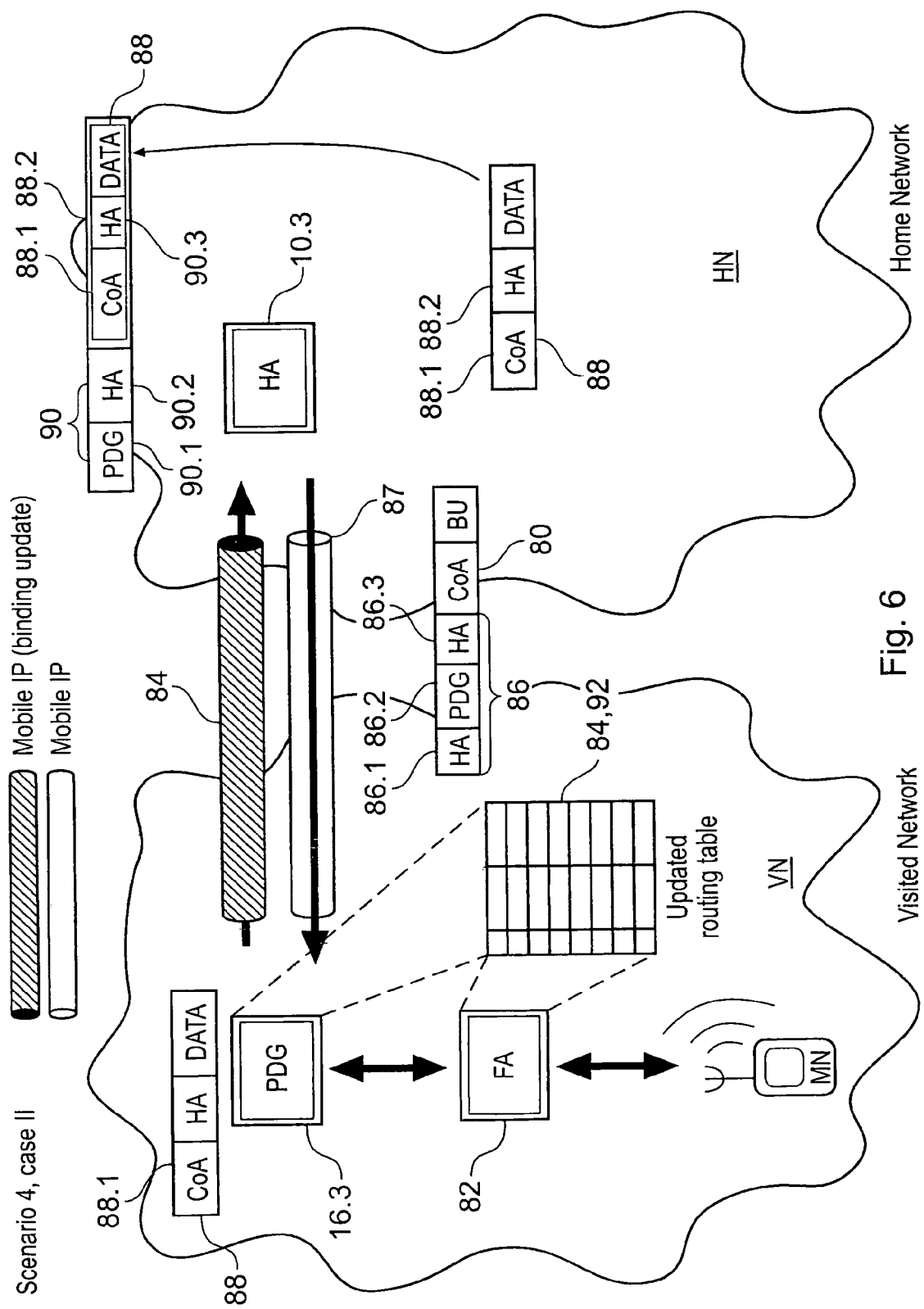
FIG. 6 provides a schematic block diagram of a home packet data network and a visited packet data network, in which the visited network includes a packet data gateway and a foreign agent, and illustrating an example of the present technique.
Figure 7:
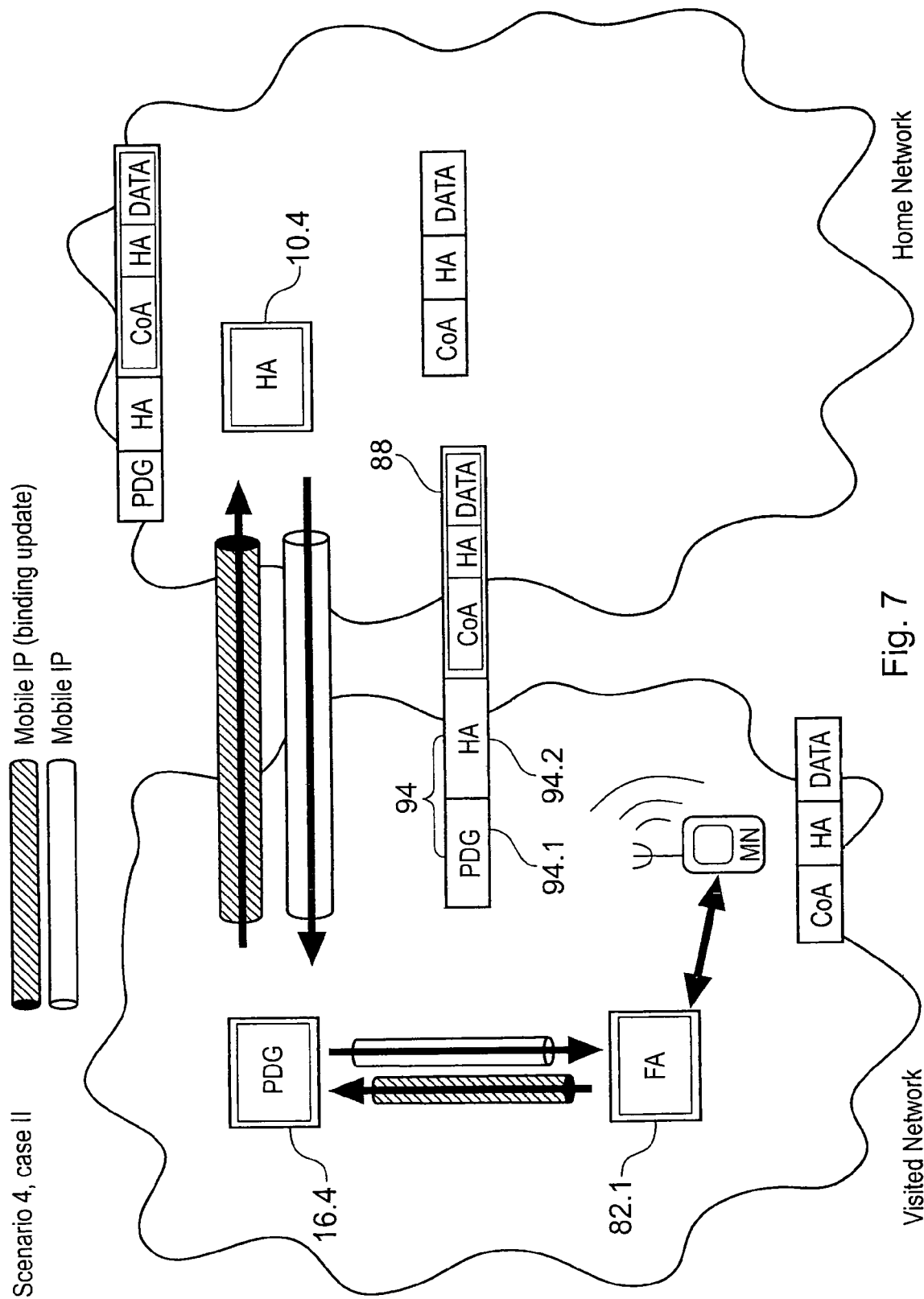

FIG. 6 provides an illustration of an example where the packet data gateway is provided within the visited network VN. As for the example shown in FIGS. 4 and 5 once the mobile node MN has roamed to the visited network, the binding update process is performed in which a binding update packet 80 is sent from the foreign agent 82 to a home agent 10.3 within the home network HN. Thus as with the previous example the foreign agent 82 establishes a care of address for the mobile node MN and communicates a binding update packet to the home agent 10.3. However, as illustrated in FIG. 6 the foreign agent 82 is arranged to communicate the binding update packet to the home agent 10.3 via the packet data gateway 16.3. For the example shown in FIG. 6 a routing table 84 of the foreign agent 82 is adapted to identify the packet data gateway as the default next routing address for packets addressed to the home agent 10.3 within the home network HN. In another example shown in FIG. 7 a foreign agent 82.1 is arranged to tunnel packets to the packet data gateway 16.4 via a tunnel by encapsulating the packets for communication to the home agent using a tunneling header.

Returning to FIG. 6 the binding update packet 80 is communicated to the home agent 10.3 via the mobile IP binding update tunnel 84. To this end, a mobile IP header 86 includes the home address of the mobile node HA as the destination address 86.1 and the address of the packet-data gateway PDG as the source address 86.2. Following receipt of the binding update packet 80 at the home agent 10.3 the home agent 10.3 updates information that the mobile node MN is at the care of address in the visited network VN in accordance with a conventional IPv4 binding update. However, the home agent 10.3 then operates to establish a mobile IP tunnel 87 between the home agent 10.3 and the packet data gateway 16.3.

In this example the mobile internet protocol tunnel is required to communicate in the internet packet between the home agent and the packet data gateway and between the packet data gateway and the foreign agent. Therefore the home agent 10.3 establishes statically or dynamically the mobile IP tunnel 87 to tunnel a packet received at the home agent 10.3 to the packet data gateway 16.3. An example of such a packet is shown to carry an internet data packet from the correspondent node CN 88, which has the care of address of the mobile node CoA as the destination address 88.1 and the mobile node's home address HA 88.2 as the source address. The internet data packet 88 received at the home agent 10.3 is then tunneled via the mobile internet protocol tunnel 87 using the mobile IP header 90. The mobile internet protocol header 90 includes the address of the packet data gateway as the destination address 90.1 and the address of the home agent as the source address 90.2. The payload 90.3 provides the received packet 88. Thus after the data packet 88 is communicated by the mobile internet protocol tunnel 87 and received at the packet data gateway, the packet data gateway 16.3 removes the mobile internet protocol header 90 to form a received data packet 88.

The packet data gateway 16.3 is then arranged to communicate the received packet 88 to the foreign agent 82 which is then forwarded to the mobile node at the care of address 88.1. To this end, in one example the packet data gateway is arranged to identify the foreign agent as the default next address of data packets using an updated routing table 92. Alternatively, the care of address of the mobile node identifies the foreign agent.

Returning to FIG. 7 a corresponding example to that is shown in FIG. 6 with the exception that the packet data gateway is arranged a tunnel packets from the foreign agent 82.1. Thus the binding update procedure is the same as that shown in FIG. 6. However, unlike in FIG. 6 the received data packet 88 in step 3 is then encapsulated using a tunneling header 94 which has the destination address of the foreign agent as 94.1 and the address of the packet data gateway as the source address 94.2. Thus the received packet 88 is recovered by removing the tunneling header 94 and forwarded by the foreign agent 82.1 to the mobile node MN.

PDG in Visited Network, IPv4 with No Foreign Agent

Figure 8A:
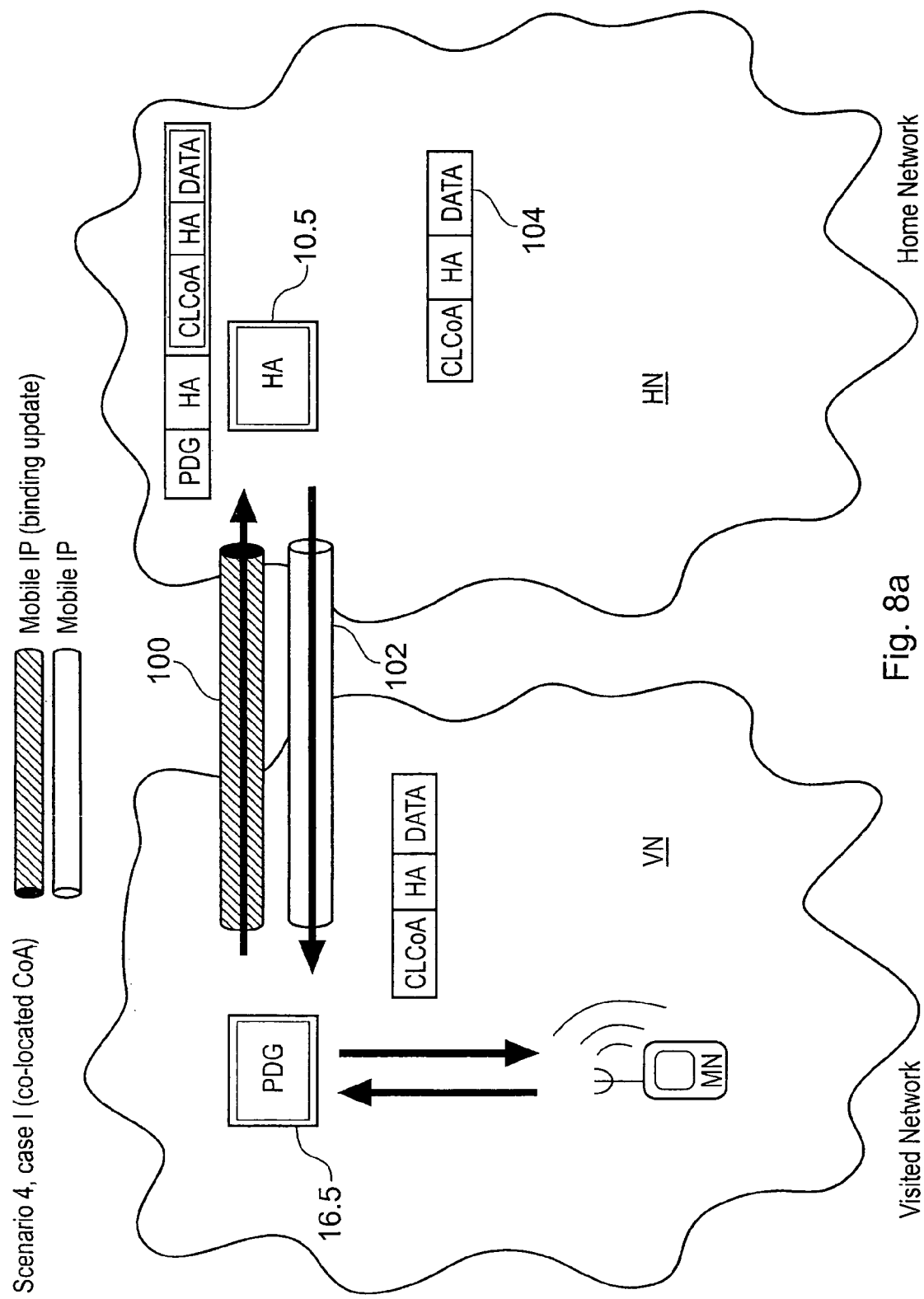
FIG. 8a provides a schematic block diagram for an example in which the packet data gateway is located in the visited packet data network and the mobile node generates a co-located care of address illustrating an example of the present technique.

FIG. 8a illustrates an example in which packet data gateway 16.5 is located within a visited network VN and communication is effected using IPv4. For this example the mobile node MN generates its own co-located care of address CLCoA as for the example illustrated in FIG. 2. The example shown in FIG. 8a corresponds to that shown in FIG. 2 and so only the differences between the example in FIG. 8a and that in FIG. 2 will be described. For the example shown in FIG. 8a the packet data gateway 16.5 and home agent 10.5 are arranged to establish a binding update tunnel 100 and a mobile internet protocol tunnel 102 as for the example shown in FIG. 2. However, unlike the example shown in FIG. 2 there is no requirement to establish an internet protocol security tunnel between the home agent and the packet data gateway and likewise between the packet data gateway 16.5 and the mobile node MN. As for the example shown in FIGS. 2 and 3 the mobile node MN is arranged to route internet packets to the home agent via the packet data gateway using either an update of a routing table or creating a tunnel. Otherwise the operations for performing the binding update and communicating received data packets 104 to the mobile node MN correspond to that explained in FIGS. 2 and 3 and supported by the other example embodiments in FIGS. 4, 5, 6 and 7 and so these would not be described further.

PDG in Visited Network, IPv4 with Foreign Agent located in PDG

Figure 8B:
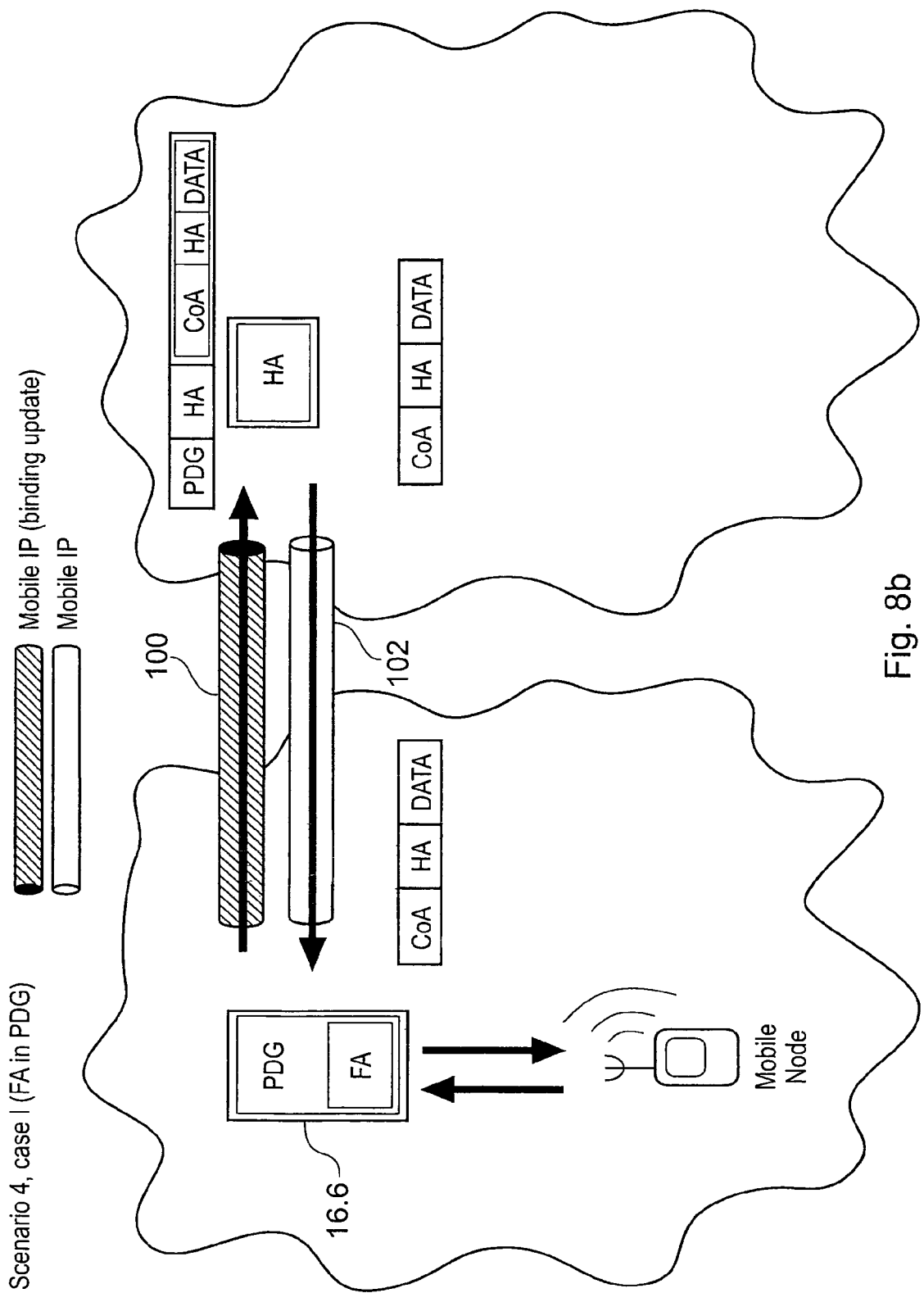
FIG. 8b shows the same example as FIG. 8a except that the foreign agent is co-located with the packet data gateway.

FIG. 8b illustrates an example in which the foreign agent FA is located in the packet data gateway PDG 16.6. The PDG-FA combination is located within a visited network VN and communication is effected using IPv4. This is a simple scenario as packets do not have to be tunneled between the foreign agent FA and the packet data gateway PDG in the visited network, and no tunneling is required within the home network HN. All that is required, for both binding updates and packets arriving at the home agent HA destined for the mobile node MN, is for two tunnels to be established between the home agent HA and the PDG-FA 16.6. These tunnels are represented in FIG. 8b in the same way as those shown in FIG. 8a.

Mobile IPv6 Route Optimisation for Correspondent Node Binding Update

Example embodiments in which internet packets communicated to and from a mobile node when attached to a visited network, so that these pass through a packet data gateway for the mobile IPv6 case will now be described with reference to FIGS. 9, 10, 11 and 12. FIGS. 9, 10, 11 and 12 illustrate corresponding examples to those shown in FIGS. 2 to 8 for the mobile IPv4 case. Generally, the mobile IPv6 case corresponds to the examples for the mobile IPv4 except that for mobile IPv6 no foreign agent appears within the visited network because the mobile node is arranged to create its own care of address. However, unlike the mobile IPv4 case the mobile IPv6 case includes a procedure for route optimisation facilitated by a correspondent node binding update procedure. As such, further adaptation of the packet data gateway and/or the home agent is required in order to arrange for all internet packets to be routed to and from the mobile node within the visited network via a packet data gateway.

Figure 9:
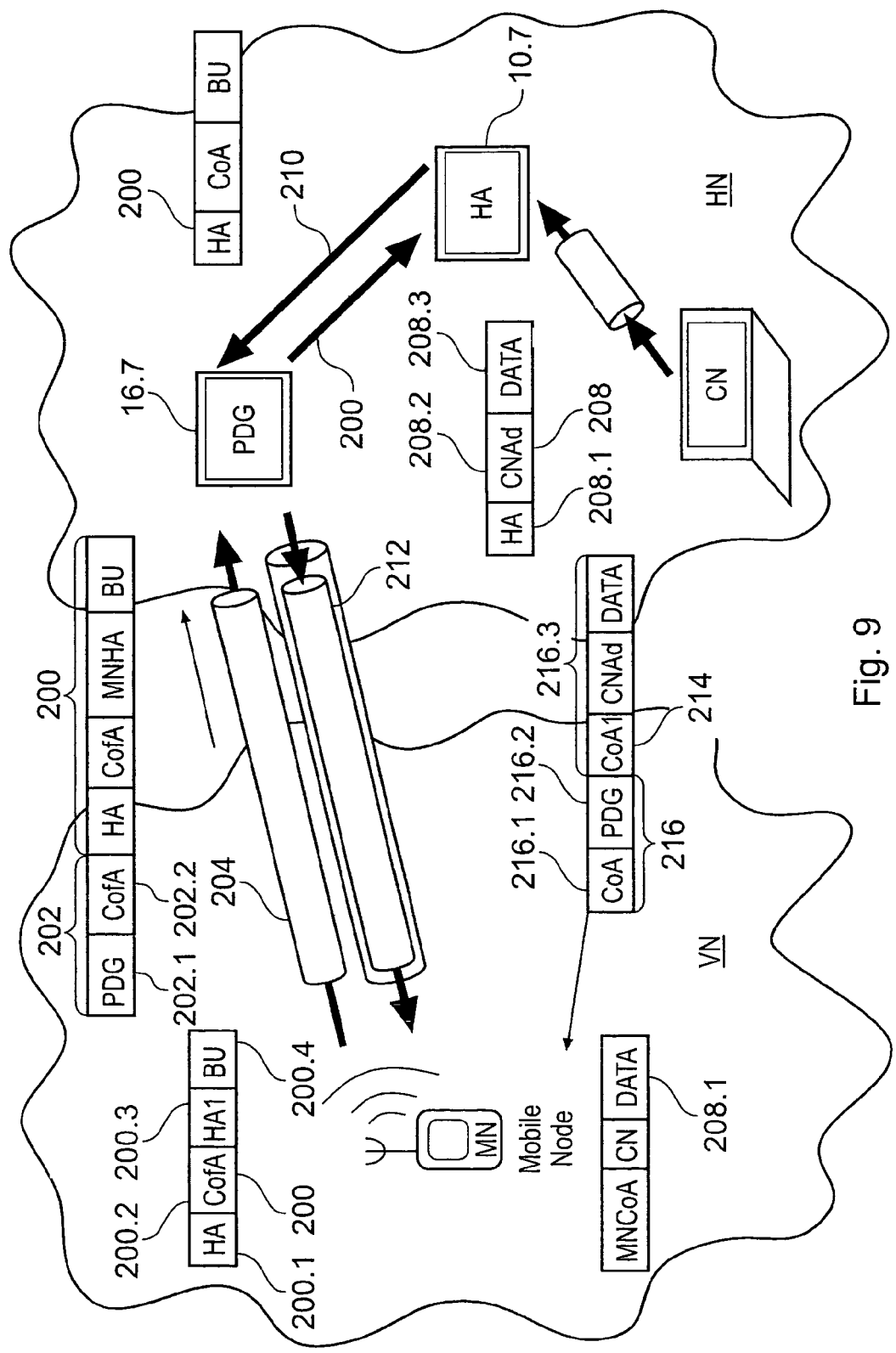
FIG. 9 provides a schematic block diagram for an example corresponding to the shown in FIG. 1, in which the mobile node operates in accordance with internet protocol version 6 (IPv6), the packet data gateway is in the home packet data network, and illustrating home agent tunneling according to the present technique.

Considering the example shown in FIG. 9, the mobile node which arrives in the visited network VN and generates a binding update packet 200 for communication to its home agent 10.6 which is shown within the home network HN. The binding update packet 200 includes a destination address of its home agent within the home network 200.1 (which may be the mobile node's own home address), a care of address CoA of the mobile node MN as the source address 200.2 and as part of an extension header field the home address of the mobile node 200.3 as well as a field indicating that the packet is a binding update 200.4. However, in order to ensure that the binding update packet is communicated via the packet data gateway, the mobile node MN is arranged to encapsulate the binding update packet 200 using a binding update tunneling header 202, for communicating the binding update packet 200 via a tunnel 204. The binding update header 202 includes an address of the packet data gateway as the destination address 202.1 and the care of address of the mobile node as the source address 202.2.

After receiving the binding update packet via the tunnel 204, the packet data gateway 16.7 forwards the recovered binding update packet 200 to the home agent 10.7 as represented by an arrow 206. As for the previous examples the packet data gateway 16.7 can be adapted to forward the internet packets to the home agent 10.7 using either an adaptation of its routing table, or establishing a dedicated tunnel. It will therefore be appreciated that both of these examples are possible and so these have been represented generically by the arrow 206.

Once the home agent 10.7 has received the care of address CoA of the mobile node the internet packets can be forwarded to the mobile node within the visited network by the home agent. For example, if an internet packet 208 is received by a correspondent node CN then this will be forwarded to the home agent because the packet would be addressed to the home address of the mobile node as the destination address 208.1. Correspondingly the source address will be the address of the correspondent node 208.2. Since the home agent 10.7 received the binding update packet from the packet data gateway 16.7, it will arrange for all internet packets which are addressed to the mobile node to be forwarded to the packet data gateway 16.7 and as with previous examples this can be done by either updating the routing table or by establishing a dedicated tunnel and so this is generally represented by an arrow 210. As with a conventional operation since the data packet 208 is forwarded to the home agent 10.7 using the mobile node's home address HA, the home agent 10.7 having received the binding update packet 200 will update the relevant address for the mobile node as the care of address CoA so the data packet 208 will be forwarded to the packet data gateway for communicating to the mobile node. Thus as illustrated in FIG. 9 by a mobile IP tunnel 212 data packet 208 is encapsulated using a mobile IP header 216 which has the care of address of the mobile node CoA as the destination address 216.1 and the address of the packet data gateway as the source address 216.2. The remainder of the payload 216.3 contains the internet data packet 208.

Once the tunneled data packet 214 is received by the mobile node MN then the mobile IP header is 216 is removed to provide the received internet packet 208 at the mobile node MN. Thus far, the example illustrated in FIG. 9 corresponds to the previous examples for mobile IPv4 with appropriate changes being made to reflect the difference between IPv4 and IPv6. However, a significant difference between the previous examples which is provided by the mobile IPv6 is a facility for route optimisation provided by the mobile node MN sending a correspondent node binding update to a correspondent node CN. A corresponding example for providing a correspondent node binding update to that shown in FIG. 9 is shown in FIG. 10.

Figure 10:
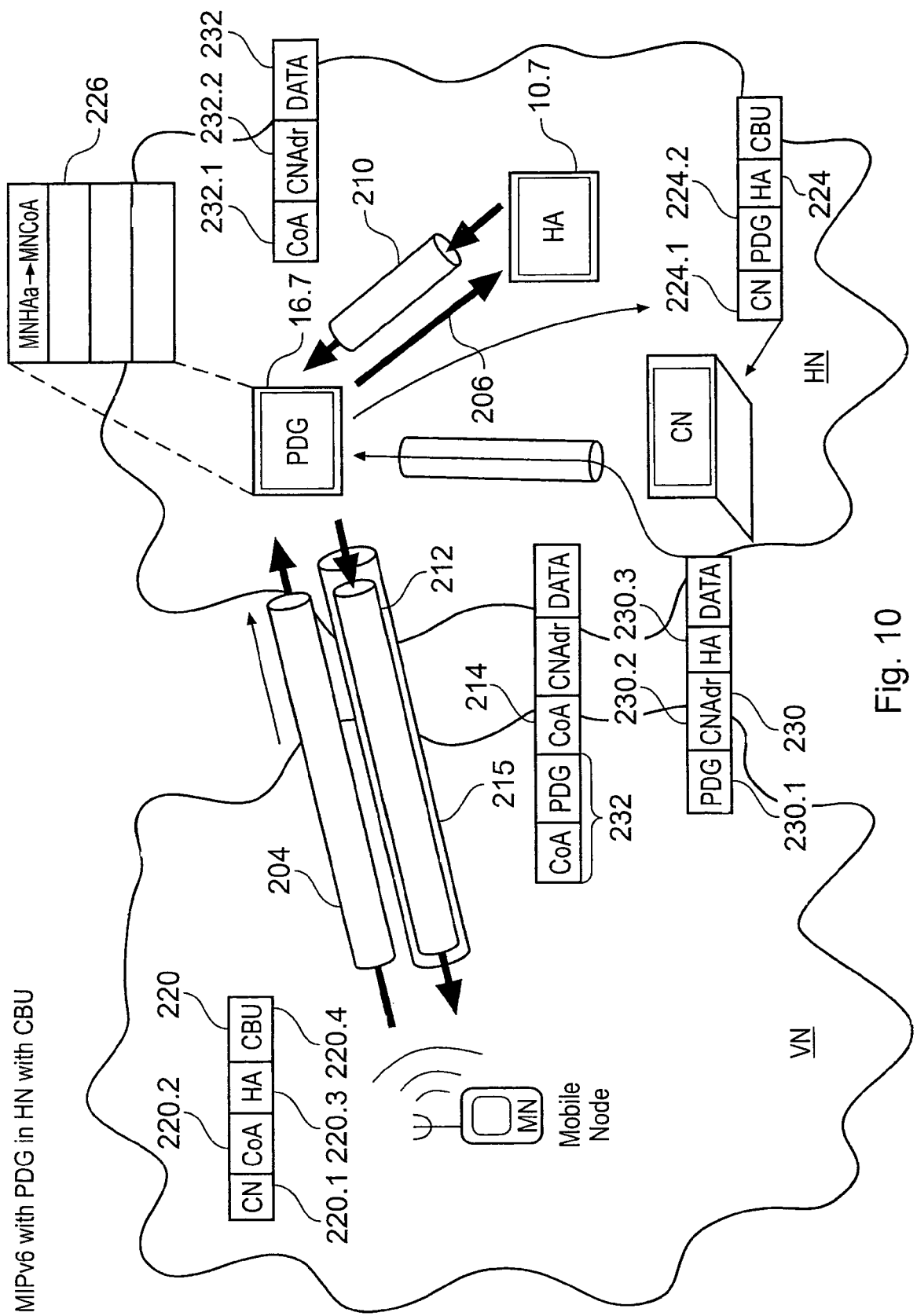
FIG. 10 provides a schematic block diagram for the example of FIG. 9, illustrating a route optimisation process through a correspondent node binding update process.

In FIG. 10 the mobile node MN when attached to the visited network VN communicates a correspondent binding update packet 220 to the correspondent node CN. As shown in FIG. 10 the correspondent binding update 220 has the address of the correspondent node CN as the destination address 220.1 with the care of address of the mobile node CoA as the source address 220.2 and included within a type 2 routing header field is provided the home address of the mobile node 220.3. A data field 220.4 provides an appropriate identifier that the internet packet 220 is a correspondent binding update. As for the example shown in FIG. 9 the correspondent binding update is then tunneled to the packet data gateway 16.7 by the mobile node MN due to the mobile node MN including a pre-set function which causes an internet protocol tunnel 204 to be set up between the mobile node MN and the packet data gateway 16.7 within the home network HN.

Upon receipt of the correspondent binding update 220 the packet data gateway 16.7 adapts the correspondent binding update to replace the care of address of the mobile node CoA with the address of the packet data gateway as a care of address to form an adapted correspondent binding update packet 224. Thus the packet data gateway replaces the care of address of the mobile node CoA with its own address packet data gateway within the source address field 224.2 with the destination address field 224.1 identifying the address of the correspondent node CN.

In addition, the packet data gateway 16.7 also builds a table which associates the home address of the mobile node HA which is provided within the type 2 routing header field 220.3 within the correspondent binding update packet 220. The home address of the mobile node HA is associated with the care of address of the mobile node CoA within a database table 226. Thus the mobile nodes home address HA provided in the extension header field 220.3 serves to provide the packet data gateway 16.7 with an association between the home address HA and the care of address of the mobile node CoA. Thus by substituting the care of address of the mobile node CoA with its own address PDG the packet data gateway 16.7 forces the correspondent note CN to route all packets which are to be communicated to the mobile node to go via the packet data gateway. As a result the packet data gateway 16.7 complies with the mobile IPv6 standard in performing a route optimisation of the correspondent node in accordance with the correspondent node binding update procedure whilst still forcing all internet packets which are to be communicated to the mobile node within the visited network to go via the packet data gateway 16.7.

For the example shown in FIG. 10 if the correspondent node wishes to communicate a data packet to the mobile node, the correspondent node CN will use the address of the packet data gateway PDG as the destination address of an internet data packet 230 with the source address being 230.2 being that of the correspondent node CN. As for the example shown in FIG. 9 once the packet data gateway receives the internet data packet 230 for communication to the mobile node, this packet is tunneled via the mobile internet protocol tunnel 212 using a tunneling header 232. However, in order to ensure that the internet packet 230 reaches the mobile node, the packet data gateway 16.7 replaces the destination address 230.1 with the care of address of the mobile node CoA to form an adapted internet data packet 232. To this end, the internet protocol data packet sent from the correspondent node CN includes the home address of the mobile node HA in the extension header field 230.3 in accordance with the mobile IPv6 standard. Thus the packet data gateway 16.7, after receiving the internet protocol data packet, detects the home of address of the mobile node HA in the extension header field and uses the home address of the mobile node HA to retrieve the mobile nodes care of address CoA from the data base table 226. The packet data gateway 16.7 therefore forms the adapted internet data packet 232 by replacing its own address with the care of address of the mobile node in the destination address field 232.1. The adapted internet data packet can then be sent via the mobile IP tunnel 212 using the mobile IP header 232 to the mobile node at the mobile nodes care of address.

As with other examples shown above, the mobile internet protocol security tunnel 215 may also be established between the packet data gateway and the mobile node.

Mobile IPv6 Packet Data Gateway in the Visited Network

Figure 11:
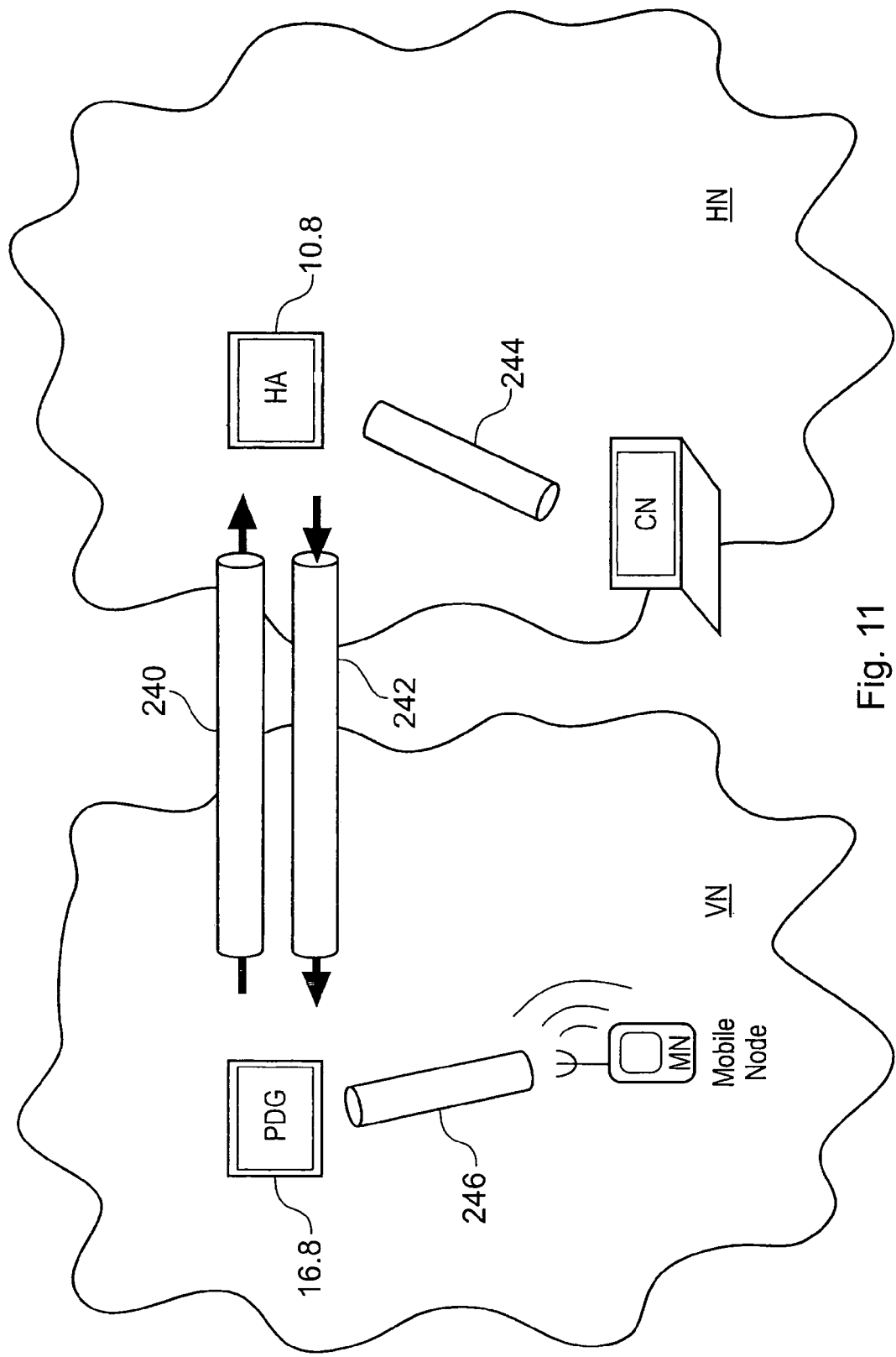
FIG. 11 provides a schematic block diagram for an example in which the mobile node operates in accordance with internet protocol version 6 (IPv6), the packet data gateway is in the visited packet data network, and illustrating home agent tunneling according to the present technique.
Figure 12:
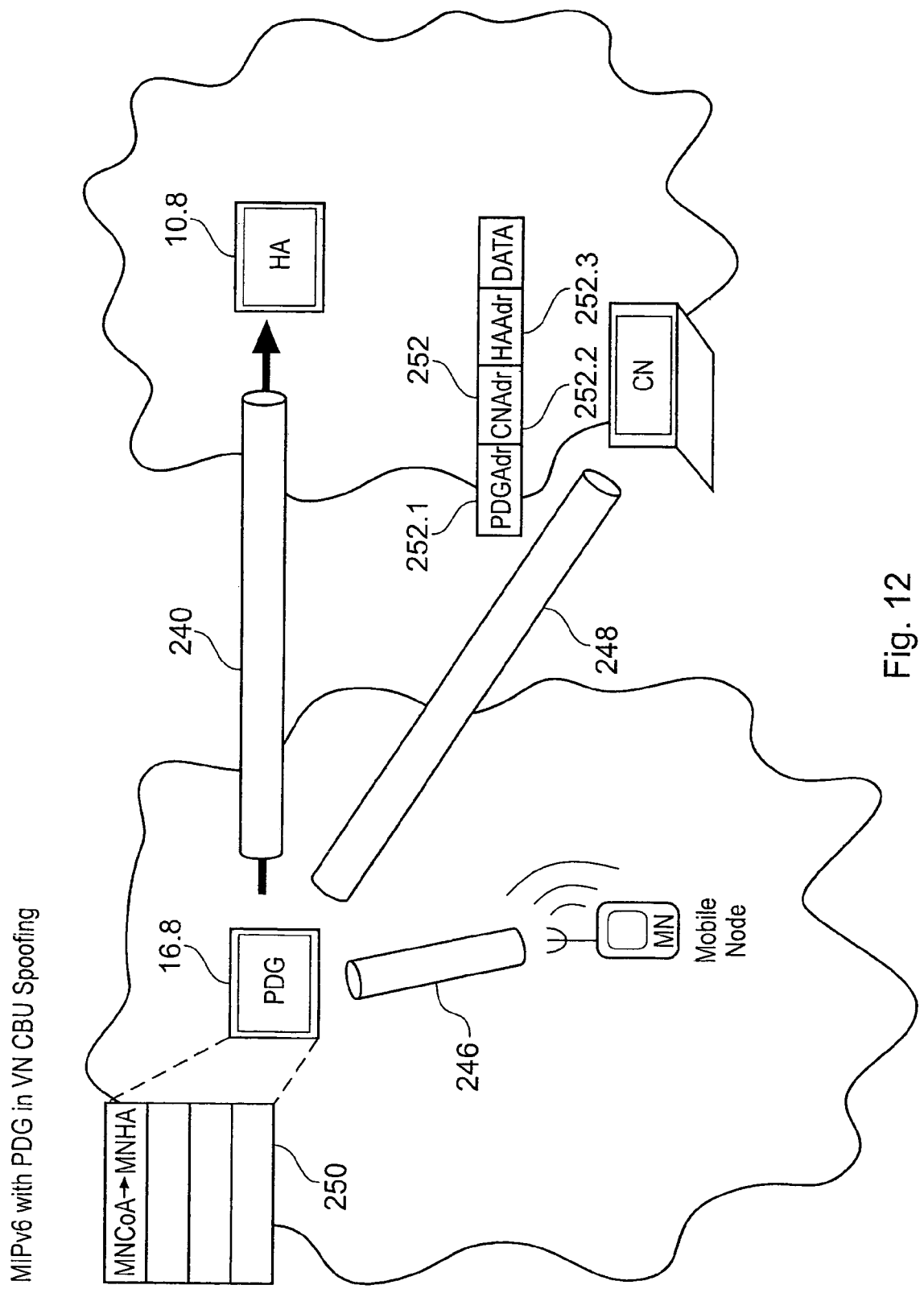
FIG. 12 provides a schematic block diagram for the example of FIG. 11, illustrating a route optimisation process through a correspondent node binding update process.

FIGS. 11 and 12 provide corresponding examples to those of FIGS. 9 and 10 but with the packet data gateway within the visited network VN. As shown in FIG. 11 the mobile node MN is adapted to communicate internet packets to and from a packet data gateway 16.8 within the visited network VN. As before communication can be effected using either an adaptation of a routing table within the mobile node or establishing a dedicated tunnel for internet protocol packets. As for example shown in FIG. 9 following a binding update procedure the mobile node sends a binding update to a home agent 10.8 within its home network HN providing the home agent 10.8 with a care of address CoA of the mobile node MN. As such internet packets received by the home agent from a correspondent node can be communicated to the mobile node at the care of address CoA within the visited network VN. To this end, the home agent 10.8 establishes static or dynamic tunnel from the home agent 10.8 to the packet data gateway 16.8. The received packets at the packet data gateway are then tunneled to the mobile node MN. As for the example of FIG. 10 once the mobile node has communicated a corresponding binding update to the correspondent node CN, route optimisation can be performed to the effect that packets can be sent directly between the correspondent node and the mobile node MN. However, in accordance with the example shown on FIG. 10 the packet data gateway 16.8 is arranged to replace the care of address CoA of the mobile node in the correspondent binding update packet with its own address so that the correspondent node always sends internet packets directed to the mobile node to the packet data gateway 16.8 instead. Thus the packet data gateway is "spoofing" a binding update so that the correspondent node CN acts as if that the mobile node has a care of address CoA which is the address of the packet data gateway 16.8. As for the example shown in FIG. 10 the packet data gateway uses database table 250 to store an association between the care of address CoA of the mobile node and the home address of the mobile node HA which is provided within a type 2 routing header field of the correspondent binding update received from the mobile node. Thus when the correspondent node communicates an internet data packet 252 to the mobile node it uses the address of the packet data gateway 16.8 as the destination address 252.1 because the correspondent node now acts as if the packet data gateway 16.8 is the address of the mobile node. By providing the home address of the mobile node in accordance with the mobile IPv6 standard in the type 2 routing header field 252.3, the packet data gateway 16.8 is able to identify the care of address of the mobile node CoA and replace its address PDG as a destination address with the care of address of the mobile node CoA to forward the internet packet 252 to the mobile node MN via the tunnel 246.

Various aspects and features of the present invention are defined in the appended claims. Various modifications may be made to the embodiments herein before described without departing from the scope of the present invention. In particular, the present invention is not limited to a packet data network standard or internet protocol version.

The invention claimed is:

1. A telecommunications system operable to provide a mobile communications session to a mobile node using an internet protocol, comprising a home packet data network operable to communicate internet packets to and from the mobile node to provide the communications session, when the mobile node is affiliated with the home packet data network, the home packet data network including a home agent of the mobile node, and a visited packet data network operable to communicate internet packets to and from the mobile node to provide the communications session, when the mobile node is affiliated with the visited packet data network, wherein one of the home packet data network or the visited packet data network includes a packet data gateway for controlling the communication of the internet packets to and from the home packet data network from and to the visited packet data network, and the mobile node is operable to communicate a correspondent node binding update internet packet to the correspondent node via the packet data gateway, when the mobile node changes affiliation from the home packet data network to the visited packet data network, the correspondent node binding update internet packet providing a care of address of the mobile node within the visited packet data network, a home address of the mobile node, and the packet data gateway is operable to store the home address of the mobile node in association with the care of address of the mobile node, to adapt the correspondent node binding update internet packet by replacing the care of address in the received correspondent binding update packet with the address of the packet data gateway, and to communicate the adapted correspondent binding update packet to the correspondent node, wherein the correspondent node is operable to communicate internet packets to the mobile node, at the care-of-address, in the visited packet data network, via the packet data gateway, without passing through the home agent, the internet packets communicated from the correspondent node to the mobile node including the address of the packet data gateway as the destination address, the address of the correspondent node as the source address, and the home address of the mobile node as part of an extension header, and the packet data gateway is operable to receive the internet packet from the correspondent node,
to retrieve the care of address of the mobile node using the home address of the mobile node provided in the extension header field, the care of address of the mobile node having been stored by the packet data gateway in association with the home address of the mobile node,
to adapt the internet packet by replacing the destination address of the packet data gateway with the care of address of the mobile node as the destination address, and
to communicate the adapted internet packet to the mobile node at the care of address in the visited network.

2. The telecommunications system as claimed in claim 1, wherein the correspondent node binding update internet packet communicated from the mobile node to the correspondent node via the packet data gateway, includes the home address of the mobile node in an extension header field.

3. The telecommunications system as claimed in claim 2, wherein the correspondent binding update internet packet has a type 2 extension header field.

4. The telecommunications system as claimed in claim 2, wherein the home packet data network is operable in accordance with a 3GPP standard and the visited network is operable in accordance with a non-3GPP standard, the packet data gateway being included within the home network.

5. The telecommunications system as claimed in claim 2, wherein the home packet data network is operable in accordance with a 3GPP standard and the visited network is operable in accordance with a non-3GPP standard, the packet data gateway being included within the home network.

6. The telecommunications system as claimed in claim 1, wherein the correspondent binding update internet packet has a type 2 routing header field.

7. The telecommunications system as claimed in claim 1, wherein the home packet data network is operable in accordance with a 3GPP standard and the visited network is operable in accordance with a non-3GPP standard, the packet data gateway being included within the home network.

8. The telecommunications system as claimed in claim 1, wherein the home packet data network is operable in accordance with a non-3GPP standard and the visited network is operable in accordance with a 3GPP standard, the packet data gateway being included within the visited network.

9. The telecommunications system as claimed in claim 1, wherein the internet protocol is version 6 (IPv6).

10. A method of providing a mobile communications session to a mobile node using an internet protocol, the method comprising
communicating internet packets to and from the mobile node to provide the communications session, when the mobile node is affiliated with a home packet data network, the home packet data network including a home agent of the mobile node,
communicating the internet packets to and from the mobile node to provide the communications session, when the mobile node is affiliated with a visited packet data network, and
controlling the communication of the internet packets to and from the home packet data network from and to the visited packet data network using a packet data gateway, wherein the communicating the internet packets to and from the mobile node to provide the communications session, when the mobile node is affiliated with a visited packet data network, includes
communicating a correspondent node binding update internet data packet from the mobile node to the correspondent node via the packet data gateway, when the mobile node changes affiliation from the home packet data network to the visited packet data network,
providing in the correspondent node binding update internet packet, a care of address of the mobile node within the visited packet data network and a home address of the mobile node,
storing the home address of the mobile node in association with the care of address of the mobile node in the packet data gateway,
adapting the correspondent node binding update by replacing the care of address in the received correspondent binding update packet with the address of the packet data gateway,
communicating the adapted correspondent binding update internet packet to the correspondent node, communicating internet packets from the correspondent node to the mobile node, using a destination address in the internet packets of the packet data gateway and the home address of the mobile node in an extension header field, provided to the correspondent node in the correspondent node binding update internet packet by
receiving the internet packet from the correspondent node at the packet data gateway,
retrieving the care of address of the mobile node using the home address of the mobile node provided in the extension header field, the care of address of the mobile node having been stored by the packet data gateway in association with the home address of the mobile node,
adapting the internet packet by replacing the destination address of the packet data gateway with the care of address of the mobile node as the destination address, and
communicating the adapted internet packet to the mobile node at the care of address of the mobile node in the visited network.

11. An apparatus for providing a mobile communications session to a mobile node using an internet protocol, the apparatus comprising
means for communicating internet packets to and from the mobile node to provide the communications session, when the mobile node is affiliated with a home packet data network, the home packet data network including a home agent of the mobile node,
means for communicating the internet packets to and from the mobile node to provide the communications session, when the mobile node is affiliated with a visited packet data network, and
means for controlling the communication of the internet packets to and from the home packet data network from and to the visited packet data network using a packet data gateway, wherein the communicating the internet packets to and from the mobile node to provide the communications session, when the mobile node is affiliated with a visited packet data network, includes
means for communicating a correspondent node binding update internet data packet from the mobile node to the correspondent node via the packet data gateway, when the mobile node changes affiliation from the home packet data network to the visited packet data network,
means for providing in the correspondent node binding update internet packet, a care of address of the mobile node within the visited packet data network and a home address of the mobile node,
means for storing the home address of the mobile node in association with the care of address of the mobile node in the packet data gateway, means for adapting the correspondent node binding update by replacing the care of address in the received correspondent binding update packet with the address of the packet data gateway, means for communicating the adapted correspondent binding update internet packet to the correspondent node, means for communicating internet packets from the correspondent node to the mobile node, using a destination address in the internet packets of the packet data gateway and the home address of the mobile node in an extension header field, provided to the correspondent node in the correspondent node binding update internet packet by means for receiving the internet packet from the correspondent node at the packet data gateway, means for retrieving the care of address of the mobile node using the home address of the mobile node provided in the extension header field, the care of address of the mobile node having been stored by the packet data gateway in association with the home address of the mobile node, means for adapting the internet packet by replacing the destination address of the packet data gateway with the care of address of the mobile node as the destination address, and means for communicating the adapted internet packet to the mobile node at the care of address of the mobile node in the visited network.

* * * * *